United States Patent
Angus et al.

(10) Patent No.: US 8,667,848 B2
(45) Date of Patent: Mar. 11, 2014

(54) PRESSURE INDICATOR

(75) Inventors: Douglas J. Angus, Elgin (GB); Alexander E. H. Fitzhugh, Bristol (GB)

(73) Assignee: Rolls-Royce PLC, London (GB)

( * ) Notice: Subject to any disclaimer, the term of this patent is extended or adjusted under 35 U.S.C. 154(b) by 192 days.

(21) Appl. No.: 13/226,023

(22) Filed: Sep. 6, 2011

(65) Prior Publication Data

US 2012/0090397 A1 Apr. 19, 2012

(30) Foreign Application Priority Data

Oct. 14, 2010 (GB) .................................. 1017351.6
Aug. 3, 2011 (GB) .................................. 1113348.5

(51) Int. Cl.
*G01L 7/00* (2006.01)

(52) U.S. Cl.
USPC ............................................. 73/700; 116/266

(58) Field of Classification Search
None
See application file for complete search history.

(56) References Cited

U.S. PATENT DOCUMENTS

| | | |
|---|---|---|
| 1,619,444 A | 3/1927 | Taylor |
| 2,486,133 A | 10/1949 | Egger |
| 2,804,093 A | 8/1957 | Scherer |
| 3,224,020 A | 12/1965 | Mori et al. |
| 4,299,253 A | 11/1981 | Burton |
| 4,413,524 A | 11/1983 | Kosh |
| 4,517,844 A | 5/1985 | Powell |
| 4,668,889 A | 5/1987 | Adams |
| 5,343,754 A | 9/1994 | Stone |
| 5,509,312 A | 4/1996 | Donzier et al. |
| 2003/0131666 A1 | 7/2003 | Ewers et al. |
| 2005/0115326 A1 | 6/2005 | Dannhauer et al. |
| 2006/0156824 A1 | 7/2006 | Grudzien |
| 2007/0120568 A1 | 5/2007 | Bjorkman et al. |
| 2010/0018319 A1 | 1/2010 | Kurtz et al. |
| 2010/0024562 A1 | 2/2010 | Kurth et al. |
| 2010/0064815 A1 | 3/2010 | Vogler |
| 2010/0175482 A1 | 7/2010 | Kurtz et al. |
| 2011/0185818 A1 | 8/2011 | Kurtz et al. |
| 2012/0090397 A1 | 4/2012 | Angus et al. |
| 2012/0090530 A1* | 4/2012 | Angus et al. .................. 116/266 |
| 2012/0090531 A1* | 4/2012 | Angus et al. .................. 116/266 |

FOREIGN PATENT DOCUMENTS

| | | |
|---|---|---|
| EP | 0 334 235 A1 | 9/1989 |
| EP | 0 350 612 A2 | 1/1990 |
| EP | 1 555 518 A2 | 7/2005 |
| GB | 570927 | 7/1945 |
| GB | 963607 | 7/1964 |
| GB | 2 456 865 A | 7/2009 |
| JP | A-61-167832 | 7/1986 |
| JP | A-10-54326 | 2/1998 |
| JP | A-2005-257551 | 9/2005 |

(Continued)

OTHER PUBLICATIONS

British Search Report issued in British Patent Application No. 1113348.5 dated Nov. 23, 2011.

(Continued)

*Primary Examiner* — Andre Allen
(74) *Attorney, Agent, or Firm* — Oliff PLC

(57) ABSTRACT

A pressure indicator for indicating pressure of a pressure source. The indicator comprises a first reservoir which defines a first enclosed volume having a first inlet pipe for communication between the first enclosed volume and a first source of pressurized fluid. A passage which provides a flow path for the pressurized fluid.

8 Claims, 4 Drawing Sheets

(56) References Cited

FOREIGN PATENT DOCUMENTS

| | | |
|---|---|---|
| SU | 621981 | 8/1978 |
| WO | WO 2006/076745 A1 | 7/2006 |
| WO | WO 2009/077433 A1 | 6/2009 |

OTHER PUBLICATIONS

Partial European Search Report issued in European Application No. 11 18 0144 on Nov. 21, 2011.
European Search Report issued in European Application No. 11 18 0143 on Nov. 21, 2011.
European Search Report issued in European Application No. 11 18 0140 on Nov. 21, 2011.
British Search Report issued in British Application No. GB1115279.0 on Jan. 5, 2012.
Jan. 31, 2013 Office Action issue in U.S. Appl. No. 13/225,983.
Search Report issued in British Application No. GB1017959.6 dated Feb. 25, 2011.
Search Report issued in British Application No. GB1017351.6 dated Mar. 31, 2011.
Search Report issued in British Application No. GB1017355.7 dated Apr. 1, 2011.
U.S. Appl. No. 13/225,768, filed Sep. 6, 2011 in the name of Douglas J. Angus et al.
U.S. Appl. No. 13/225,983, filed Sep. 6, 2011 in the name of Douglas J. Angus et al.
May 9, 2013 Office Action issued in U.S. Appl. No. 13/225,983.

* cited by examiner

PRESSURE INDICATOR

The present disclosure relates to a pressure indicator.

A conventional arrangement for indicating pressure is shown in FIG. 1. This shows a pressure indicator 10 which comprises a first reservoir 12 which defines a first enclosed volume 14 (or "pressure tapping") having a first inlet pipe 16 defining a first path length "L". The first inlet pipe 16 provides flow communication between the first enclosed volume 14 and a first source of pressurised fluid 20. A second reservoir 22 which defines second enclosed volume 24 (or "pressure tapping") having a second inlet pipe 26 that provides flow communication between the second enclosed volume 24 and a second source of pressurised fluid 30 may also be provided, as shown in FIG. 1. A pressure transducer 32 is disposed between the first enclosed volume 14 and the second enclosed volume 24, being in communication with both. The first and/or second source of pressurised fluid 20,30 may be flowing or static, where the pressure of the fluid rises and falls. The pressure transducer 32 reacts to the pressure changes in the enclosed volumes. In the case where only a single inlet pipe and enclosed volume are present, the pressure transducer may be used to indicate changes in pressure. Where a first and second inlet pipe and enclosed volume are present, as shown in FIG. 1, the pressure transducer maybe used to indicate differences in pressure between the first and second source of pressurised fluid 20,30.

A problem with this design is that the system may exhibit Helmholtz resonance. The Helmholtz resonance may occur at a frequency which is given approximately by:

$$f = \frac{v}{2\pi}\sqrt{\frac{A}{V_0 L}}$$

Where v is the speed of sound in the fluid, A and L are the cross-sectional area and length of the inlet pipe respectively, and $V_0$ is the volume of the reservoir (i.e. the enclosed volume).

Helmholtz resonance occurs when a pressurised compressible fluid within an enclosed volume (or "cavity") equalizes pressure with respect to a reduced external pressure, i.e. the source of pressurised fluid 20,30. The fluid within the enclosed volume expands driving the fluid in the inlet pipe out. Due to the inertia of the fluid in the inlet pipe, the pressure in the enclosed volume drops below the external pressure causing fluid to be sucked back into the enclosed volume again to create a rise in pressure above that of the external pressure. This will repeat with a decay until the pressure in the enclosed volume equalises with the source of pressurised fluid.

In instances where the external pressure varies at a frequency which is matched to a resonant frequency of the enclosed volume, the resonance will draw energy from the pressure source, and the amplitude of the pressure fluctuations within the enclosed volume will grow until they greatly exceed the amplitude of the pressure fluctuations in the pressure source, and may be sufficient to damage the pressure transducer and/or the structure which defines the inlet pipes and enclosed volumes.

One way to avoid resonance is to choose dimensions of the enclosed volumes such that the resonant frequencies of the cavities do not coincide with multiples of the external pulsing frequencies present in the source of pressurised fluid. However, it may not be possible to achieve this over the entire operational range of the equipment which the pressure indicator is attached to. Alternatively, an error in design may mean that resonance occurs in an unexpected operational range, the only solution of which may be to redesign the enclosed volumes. This may not be possible within the available space, and even if it is, it will incur time and cost penalties.

Hence a pressure indicator for indicating pressure of a pressure source which is operational over a wide range of operating conditions and exhibits low amplitude Helmholtz resonance at a resonant frequency below the operational range of the pressure indicator is highly desirable.

SUMMARY

Accordingly there is provided a pressure indicator for indicating pressure of a pressure source, the indicator comprising a first reservoir which defines a first enclosed volume having a first inlet pipe for communication between the first enclosed volume and a first source of pressurised fluid, and a passage which provides a fixed geometry flow path for the pressurised fluid.

The introduction of a flow path (or "leakage" path) will reduce the amplitude of any Helmholtz resonance generated within the enclosed volume. It thereby protects any equipment attached to the cavity.

In examples where, in operation of the device of the present disclosure, the source of pressurised fluid is flowing, the flow rate through the passage, and thus the flow induced in the first inlet pipe, may be substantially less than the flow rate of the first source of pressurised fluid.

In examples where, in operation of the device of the present disclosure, the source of pressurised fluid is static, the cross-sectional area of the passage may be substantially less than that of the source of pressurised fluid such that the flow rate in the passage induces negligible flow in the source passages.

The passage may be in communication with a source of pressurised fluid in addition to the first source of pressurised fluid.

The pressure indicator may comprise a second reservoir which defines a second enclosed volume having a second inlet pipe for communication between the second enclosed volume and a second pressure source.

The first enclosed volume and second enclosed volume may be in flow communication with one another via the passage.

The first inlet pipe and second inlet pipe may be in flow communication with one another via the passage.

The pressure indicator may further comprise a pressure transducer in communication with the first enclosed volume.

The pressure transducer may be provided in communication with the first enclosed volume and the second enclosed volume.

BRIEF DESCRIPTION OF THE DRAWINGS

Examples of the present disclosure will now be described with reference to the accompanying drawings, in which.

DETAILED DESCRIPTION OF EXAMPLES

Figure 2:
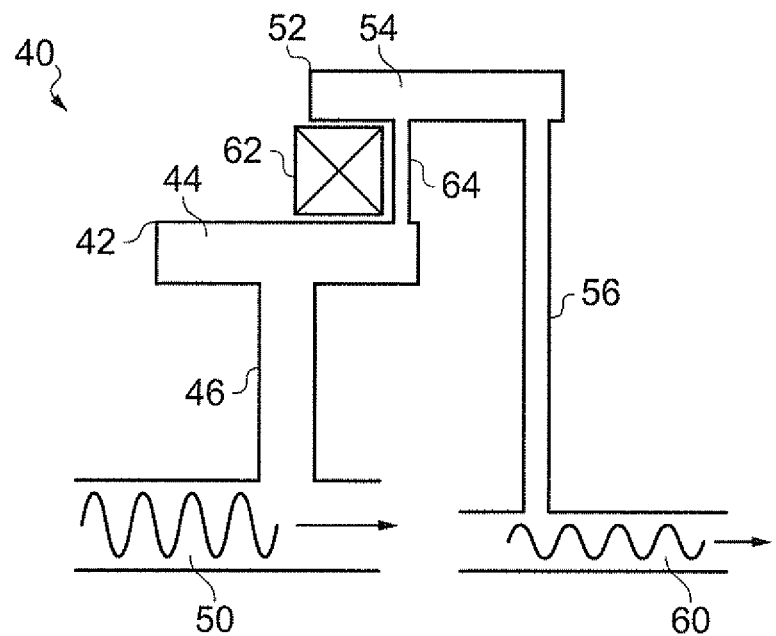
FIG. 2 shows a first example of a pressure indicator according to the present disclosure.

FIG. 2 shows a first example of a pressure indicator 40 of the present disclosure. The pressure indicator 40 comprises a first reservoir 42 which defines a first enclosed volume 44 (or "pressure tapping") having a first inlet pipe 46. The first inlet pipe 46 provides flow communication between the first enclosed volume 44 and a first source of pressurised fluid 50. The pressure indicator 40 is provided with a second reservoir 52 which defines a second enclosed volume 54 having a second inlet pipe 56 for communication between the second enclosed volume 54 and a second source of pressurised fluid 60. A differential pressure transducer 62 is provided between and in communication with the first and second enclosed volumes 44,54, for the indication of differences in pressure between the first source of pressurised fluid 50 and the second source of pressurised fluid 60. The pressure transducer 62 may be placed in communication with the enclosed volumes 44, 54, either through an orifice in the wall of the reservoirs 42,52 or by abutment with the wall of the reservoirs 42,52. A passage 64 is provided which provides a flow path for the pressurised fluid between the first enclosed volume 44 and the second enclosed volume 54. The passage 64 thus provides a flow path from pressure source 50 to pressure source 60. The passage 64 may be configured to provide a fixed geometry flow path. That is to say, the passage 64 may have a constant geometry, and does not adjust or vary during operation of the pressure indicator.

Figure 1:
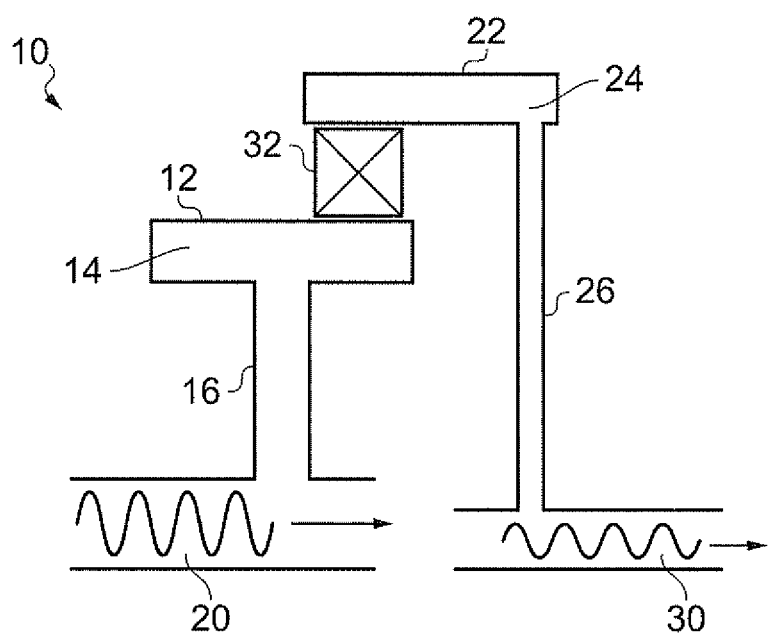
FIG. 1 shows a pressure indicator.

The passage 64 permits a small leakage path between the first and second enclosed volumes 44,54, which will result in damping of pressure oscillations. It will also alter the natural frequency of both first and second enclosed volumes 44,54. Thus the arrangement of the present disclosure provides effective damping of the pressure indicator system, and should a resonance occur, its amplitude will be significantly lower than that for a conventional system shown in FIG. 1, or the like.

Figure 3:
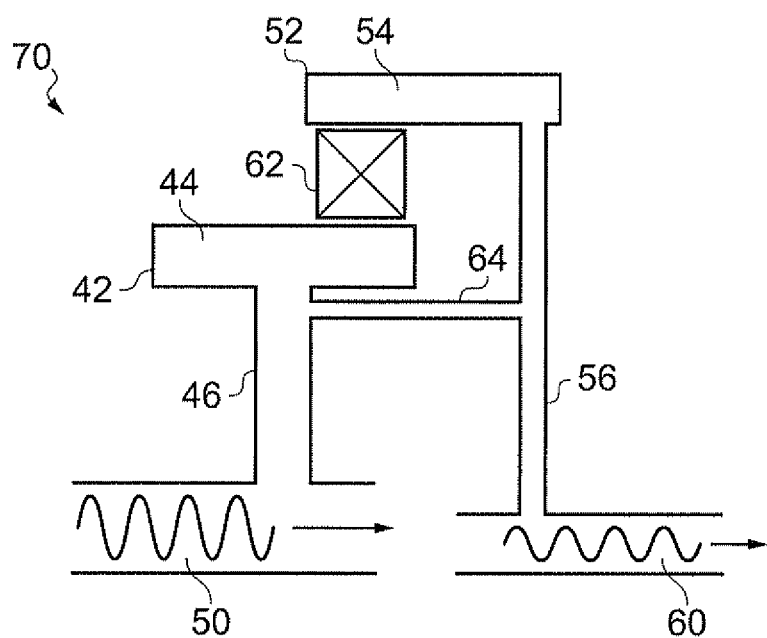
FIG. 3 shows a second example of a pressure indicator according to the present disclosure.

FIG. 3 shows an alternative example of the present disclosure. Shown is a pressure indicator 70 which is substantially the same as that shown in FIG. 2, except that rather than the passage 64 linking the first and second enclosed volumes 44,54, the first inlet pipe 46 and second inlet pipe 56 are in flow communication with one another via the passage 64. In operation this will achieve a similar effect to that achieved by the example of FIG. 2.

Figure 4:
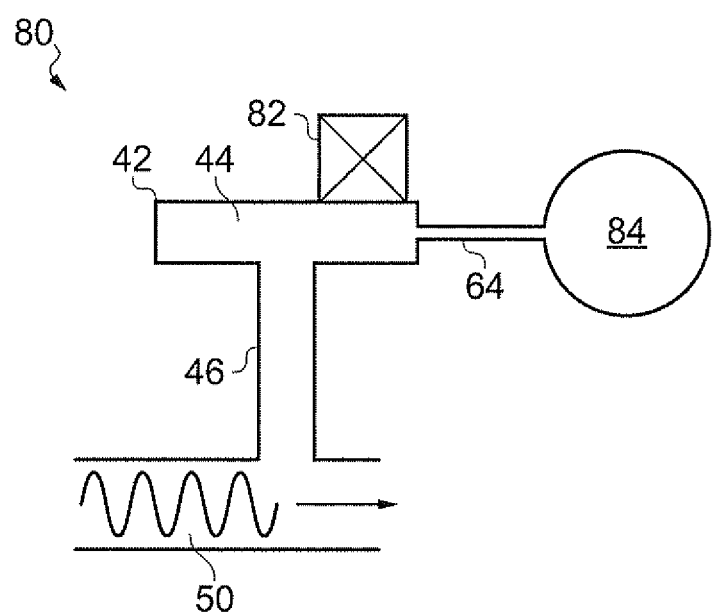
FIG. 4 shows a third example of a pressure indicator according to the present disclosure.

FIG. 4 shows an alternative example of the present disclosure, in which a pressure indicator 80 comprises many of the features of the preceding two examples, and for clarity common features share the same integer numbers. As with the previous examples, the first reservoir 42 defines a first enclosed volume 44 (or "pressure tapping") linked with the first inlet pipe 46. The first inlet pipe 46 provides flow communication between the first enclosed volume 44 and a first source of pressurised fluid 50. However, in this example, a passage 64 is provided which provides a flow path for the pressurised fluid between the first enclosed volume 44 and a source of pressurised fluid 84 in addition to the first source of pressurised fluid 50. A pressure transducer 82 may be placed in communication with the enclosed volume 44, either through an orifice in the wall of the reservoir 42 or by abutment with the wall of the reservoir 42. The pressure transducer will thus be able to register pressure variations in the first source of pressurised fluid 50.

Figure 5:
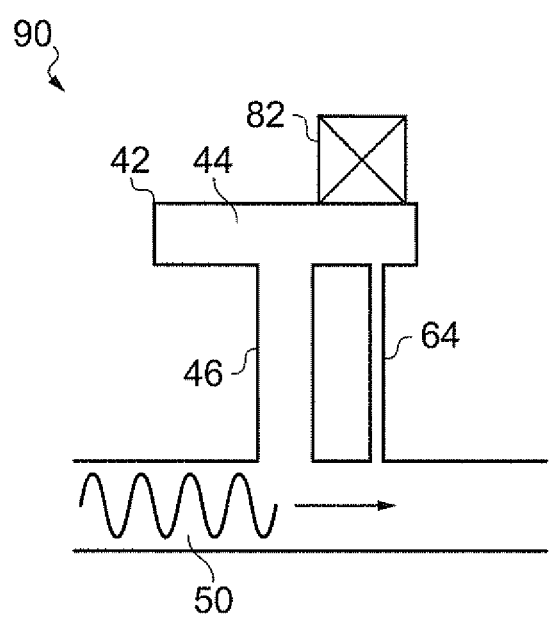
FIG. 5 shows a fourth example of a pressure indicator according to the present disclosure.

A further example is shown in FIG. 5. Shown is a pressure indicator 90 which has many features common to that of the example of FIG. 4, except that the passage 64 provides flow communication between the first enclosed volume 44 and a point downstream of, or distal to, the first inlet pipe 46 where the pressure in the first source of pressurised fluid 50 is slightly different.

As in the previous examples, passage 64 will introduce a flow path from pressure source 50 to a pressure source 84, 50 which is at a different pressure. The passage 64 may be configured to provide a fixed geometry flow path. That is to say, the passage 64 may have a constant geometry, and does not adjust or vary during operation of the pressure indicator.

As with the previous examples, in the examples of FIG. 4 and FIG. 5 the passage 64 permits a small leakage path between the first enclosed volume 44 and the pressurised fluid source 50,84, which will induce flow in the inlet pipe 46 and result in damping of pressure oscillations. It will also alter the natural frequency of the first enclosed volume 44. Thus the arrangement of the present disclosure provides effective damping of the pressure indicator system, and resonance is unlikely to occur.

It is desirable to have the passage 64 in direct communication with its respective enclosed volume, as this will induce mass flow through the entire pressure indicator system, thereby increasing the damping and the magnitude of the change in the natural frequency of the system. If the passage 64 is not in direct flow communication with its respective enclosed volume, for example as shown in FIG. 3, the passage should be located as close as possible to its respective enclosed volume to maximise the portion of the pressure indicator system through which the mass flows and hence achieve the similar effect. The closer the placement of the leakage path, i.e. the passage 64, to an enclosed volume the more of the previously stationary system is flowing and the larger the proportion of the system which is damped. The introduction of a leakage path in what would otherwise be a stationary system introduces damping. As the amount of induced flow rate is increased, the damping and the magnitude of the change in the natural frequency of the pressure indicator system is increased. Additionally, the induction of flow in parts of the system will alter the effective length of the inlet pipes and result in lowering the natural frequency of the system.

A pressure indicator according to the present disclosure, plus any equipment attached to it, will thus be less susceptible to damage due to resonance. This provides pressure indicating equipment with higher survivability than conventional systems, and which are easier to configure for a wider range of applications.

The first and/or second source of pressurised fluid 50,60 may be flowing or static, where the pressure of the fluid rises and falls.

In examples where, in operation of the device of the present disclosure, the source of pressurised fluid 50,60 is flowing, the flow rate through the passage 64, and thus the flow induced in the first inlet pipe 46 will be substantially less than the flow rate of the source of pressurised fluid 50,60.

In examples where, in operation of the device of the present disclosure, the source of pressurised fluid 50,60 is static, the cross-sectional area of passage 64 may be substantially less than that of the source of pressurised fluid 50,60 such that the flow rate in passage 64 induces negligible flow in the source passages 50,60.

In either case, the passage 64 is configured such that, in use, the flow induced in the first inlet pipe 46 may be no more than 10% of the flow rate of the source of pressurised fluid 50,60. The passage is configured such that, in use, the flow induced in the first inlet pipe 46 may be no more than 1% of the flow rate of the source of pressurised fluid 50,60.

The device of the present disclosure may also be easily retrofitted to a system.

The invention claimed is:

1. A pressure indicator for indicating pressure of a pressure source, the indicator comprising:
a first reservoir which defines a first enclosed volume having a first inlet pipe for communication between the first enclosed volume and a first source pressurized fluid: and
a passage which provides a fixed geometry flow path for the pressurized fluid, wherein the passage is in direct communication with the first enclosed volume and is in communication with a second source of pressurized fluid in addition to the first source of pressurized fluid.

2. The pressure indicator as claimed in claim 1, comprising a second reservoir which defines a second enclosed volume having a second inlet pipe for communication between the second enclosed volume and a second pressure source.

3. The pressure indicator as claimed in claim 2, wherein the first enclosed volume and the second enclosed volume are in flow communication with one another via the passage.

4. The pressure indicator as claimed in claim 2, wherein the first inlet pipe and the second inlet pipe are in flow communication with one another via the passage.

5. The pressure indicator as claimed in claim 1, further comprising a pressure transducer in communication with the first enclosed volume.

6. The pressure indicator as claimed in claim 2, wherein a pressure transducer is provided in communication with the first enclosed volume and the second enclosed volume.

7. The pressure indicator as claimed in claim 1, wherein the passage is configured such that, in use, a flow induced in the first inlet pipe may be no more than 10% of a flow rate of the first source of pressurized fluid.

8. The pressure indicator as claimed in claim 1, wherein the passage is configured such that, in use, a flow induced in the first inlet pipe may be no more than 1% of a flow rate of the first source of pressurized fluid.

* * * * *